UNITED STATES PATENT OFFICE.

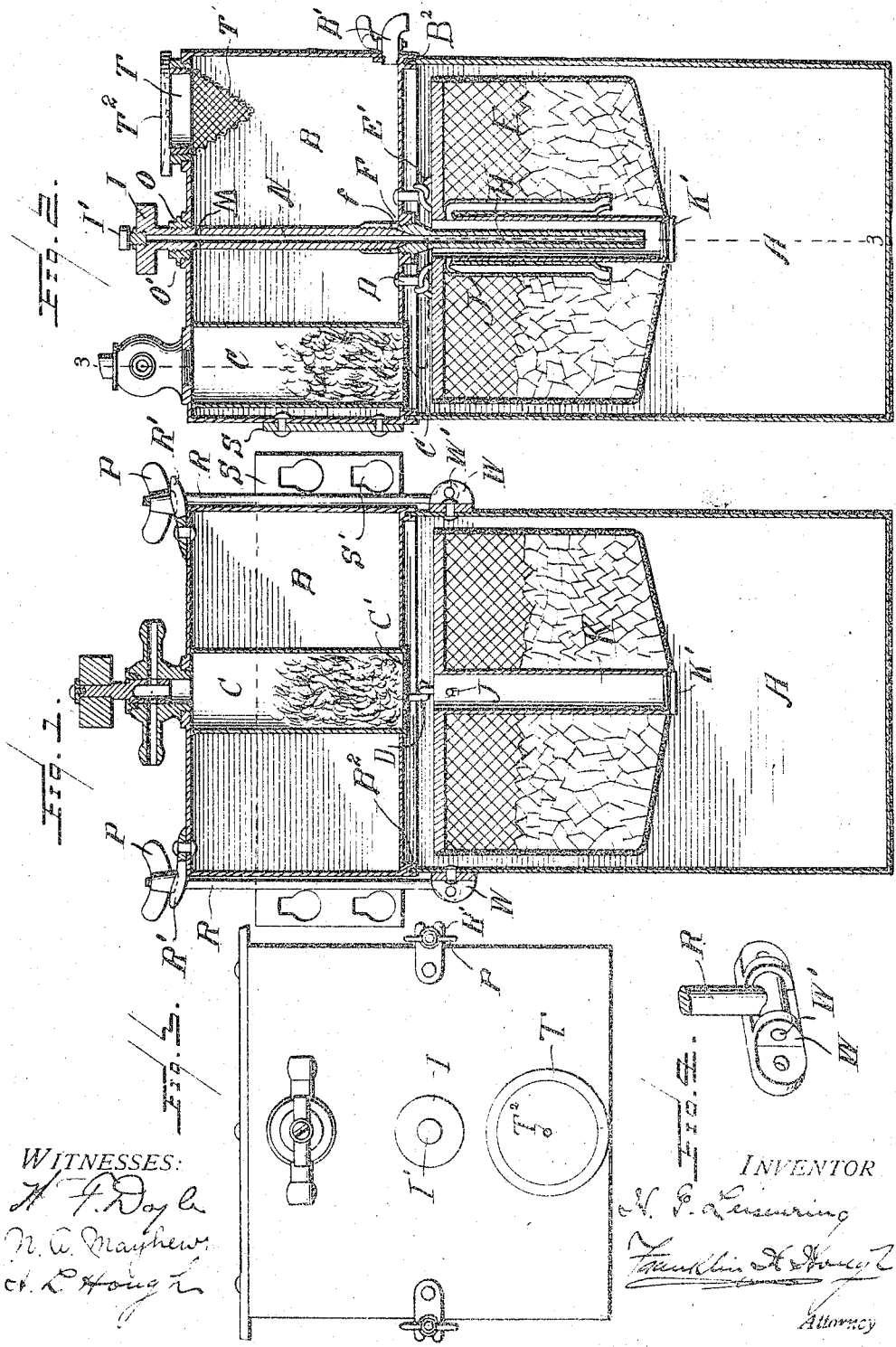

HENRY G. LEISENRING, OF WAYNE, NEBRASKA.

ACETYLENE-GAS GENERATOR.

No. 853,807.                Specification of Letters Patent.                Patented May 14, 1907.

Application filed November 15, 1906. Serial No. 343,563.

*To all whom it may concern:*

Be it known that I, HENRY G. LEISENRING, a citizen of the United States, residing at Wayne, in the county of Wayne and State of Nebraska, have invented certain new and useful Improvements in Acetylene-Gas Generators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in acetylene gas generators, and the object of the invention is to produce a simple and efficient device of this nature comprising means whereby the gas pressure is above the water supply, the latter being automatically regulated by the pressure of the gas.

The invention comprises various details of construction and combinations and arrangements of parts which will be hereinafter fully described and then specifically defined in the appended claims.

I illustrate my invention in the accompanying drawings, in which:

Figure 1 is a section on line 3—3 of Fig. 2. Fig. 2 is a vertical sectional view. Fig. 3 is a top plan view, and Fig. 4 is a detail view.

Reference now being had to the details of the drawings by letter, A designates a generator chamber which may be of any suitable size or shape, and B is a water tank positioned above the generator chamber and has a spigot B' regulating an exit at the bottom thereof.

C designates a filter tube having suitable filter material therein and provided with a coarse screen C' at its lower end covering across an opening in the bottom of the filter tube to retain the filtering material in said tube, and the upper end of said filter has a passageway through which the gas may be conveyed to a burner. Suspended from the hooks D (or in any other suitable manner), which are fastened to the bottom of the water tank is a swinging carbid basket E having loops E' adapted to engage said hooks.

F designates a union which is fitted in a threaded hole in the bottom of the water tank and is provided with openings *f* leading through the wall thereof, and has a hollow stem H which projects down into the tube K, which latter has a water-tight screw cap K' adjusted to its lower end. The lower end of said hollow stem H terminates a slight distance above the screw cap and communicates with the interior of the tube K.

N designates a tubular stem having a valve at the lower end thereof which is tapering and adapted to contact with a tapering valve seat within the union, the circumference of said tube N having threaded connection with the union, and also threads which engage a threaded plug O which is mounted in a threaded-outlined aperture O' fitted in the top of the water tank. I designates a wheel which is fixed to said tube N, and I' designates a dust cap which is adapted to be fitted in the upper end of the tube N, to close the tube and prevent dirt from entering the tube from the outside, and which can be removed when it is desired to pass a wire through said tube to clear the tube from any sediment which may collect in it from the water.

Leading from the upper portion of the tube K are the exit tubes J through which water passes from the interior of the tube K into the carbid basket. A suitable threaded plug T is mounted in the filling aperture in said tank and a water screen T', preferably of inverted conical shape, is provided underneath said filling aperture. A suitable air vent $T^2$ is formed in the plug T. The top of plug T is concaved to allow any water passing through the vent $T^2$ to pass back into the receptacle. S is a plate to which my generator is attached and is provided with slots S' whereby the same may be easily attached to the body of a vehicle or to any other object.

Ears W are fastened to the outer circumference of the generator chamber, preferably at positions diametrically opposite, and rods R with their lower end apertured, are provided to receive the pivot pins W' carried by said lugs. Fixed to the upper end of the water tank are the forked members R' which are adapted to receive said rods, and thumb nuts P are fitted upon the upper threaded ends of said rods, whereby the water tank may be securely held to the top of the generator chamber. It will be noted that the bottom of the water tank is provided with an annular groove $B^2$ adapted to receive the top of the wall of the generator chamber, a suitable packing being interposed in order to make a tight joint.

The operation of my acetylene gas generator is as follows: By turning the valve at the lower end of the tube N, water is allowed to pass through the apertures $f$ and down through the tube H into the tube K, thence rising in the latter, is allowed to make exit by dropping through the tubes J upon the carbid contained within the basket. Before the pressure of the gas generated becomes sufficiently great to cause the burners to flare, said pressure will either force the water in the tube K down and up through the tube H, back to the water tank or hold back the water in tube K, thus preventing the flow of water through tubes J upon the carbid. As the pressure is reduced in the burners, the flow of water will again start and be fed to the carbid where the supply of gas will be replenished. The closing of the valve at the lower end of the pipe N will discontinue the flowing of the water to the carbid basket, and hence no more gas will generate. It will thus be noted that by the provision of my apparatus, a steady flow of gas may be produced, which will be governed automatically by the gas pressure. If desired to close the stop cocks leading to the burners, any gas which may generate from moisture in the tubes will force the water out of the tube H through the longitudinal duct into tube N, and out through the ducts $m$ near the upper end of the water tank and which lead into the latter. Any excess of gas will escape through the same channel and out into the air through the vent in the plug to the water tank. As the basket swings freely in all directions, not only in one direction as in some generators, it strikes the sides of the generator chamber by the slightest motion of the car to which it is adapted to attach my improved acetylene gas generator and all carbid dust will be sifted from the basket and settle to the bottom of the generator chamber, thus providing a constant and fresh supply of carbid which will be reached by the water. By the provision of a generator embodying the features of my invention, no paste or wet carbid will be found in my generator as in the generators where the carbid cannot be separated as it is used, and which is a common fault with the generators commonly employed. The stop cock to the burners need never be closed unless it be desired to extinguish the lights instantly or to retain a small supply of gas in the reservoir. All that is necessary to do with my generator is to turn on the water to generate the gas and turn it off to stop the generation.

It will thus be seen that by the provision of the apparatus shown and described, a simple and efficient generator is provided embodying the principle of a water trap to govern the supply of water and gas automatically by gas pressure and, by the provision of the safety valve for the excess gas to escape through the water valve stem, an apparatus is afforded which is absolutely safe.

What I claim is:—

1. An acetylene gas generator comprising a generator chamber, a swinging carbid basket suspended therein, a water tank positioned above the generator chamber, a union mounted in a threaded aperture in the bottom of the water tank, a valve regulating the flow of water into a passageway through said union, a tube having a hollow stem extending into the basket, a tube surrounding said hollow stem and having exit nozzles near its upper end opening into the basket, a threaded plug at the lower end of said tube, and a filter tube mounted within the water tank and having a screen-protected opening at the bottom thereof leading into the dust chamber, as set forth.

2. An acetylene gas generator comprising a carbid generator chamber, a water tank positioned above the same, a threaded union mounted in an aperture in the bottom of said tank, a hollow stem projecting from the union into said chamber, a tube surrounding said hollow stem with which it communicates, tubes leading from near the upper end of said tube into said chamber, a valve adapted to contact with a seat in said union and provided with a hollow stem which has threaded connection with a plug at the top of said water tank, a swinging carbid basket suspended from the bottom of the water tank and positioned within said generator chamber, and a filter tube mounted within the water tank and having a screen protected opening between the same and the generator chamber, as set forth.

3. An acetylene gas generator comprising a carbid generator chamber, a water tank positioned above the same, a threaded union mounted in an aperture in the bottom of said tank, a hollow stem projecting from the union into said chamber, a tube surrounding said hollow stem with which it communicates, tubes leading from near the upper end of said tube into said chamber, a valve adapted to contact with a seat in said union and provided with a hollow stem which has threaded connection with a plug at the top of said water tank, a generator cap fitted in the upper end of the tubular valve stem, a carbid basket suspended from the bottom of the water tank and positioned within the generator chamber, and a filter tube positioned within the water tank and communicating through a screen opening with the generator chamber, as set forth.

4. An acetylene gas generator comprising a generator chamber, a water tank positioned above said chamber, a union having threaded connection in an opening leading through the bottom of the water tank and into said generator chamber and having openings leading to the water tank, a hollow stem projecting from the lower end of said union, a tube surrounding said hollow stem, a plug at its lower end, tubes leading from the upper portion thereof, a swinging carbid basket suspended within the generator chamber, a valve seated within said union and having openings leading through the stem thereof into the water chamber, a generator cap fitted to the end of said valve stem, a filter tube within the water tank and communicating through a screened opening with the generator chamber; and a plug to the water chamber having a vent therein, as set forth.

In testimony whereof I hereunto affix my signature in the presence of two witnesses.

HENRY G. LEISENRING.

Witnesses:
  DAN HARRINGTON,
  E. CUNNINGHAM.